US008077137B2

(12) United States Patent
Lee

(10) Patent No.: US 8,077,137 B2
(45) **Date of Patent: *Dec. 13, 2011**

(54) LIQUID CRYSTAL DISPLAY BACKLIGHT DRIVING SYSTEM WITH LIGHT EMITTING DIODES

(75) Inventor: Sang Yun Lee, Gyunggi-do (KR)

(73) Assignee: Samsung LED Co., Ltd., Gyunggi-Do (KR)

( * ) Notice: Subject to any disclaimer, the term of this patent is extended or adjusted under 35 U.S.C. 154(b) by 737 days.

This patent is subject to a terminal disclaimer.

(21) Appl. No.: 11/806,121

(22) Filed: May 30, 2007

(65) Prior Publication Data

US 2008/0002102 A1 Jan. 3, 2008

(30) Foreign Application Priority Data

Jun. 29, 2006 (KR) ........................ 10-2006-0059095

(51) Int. Cl.
*G02F 1/13357* (2006.01)

(52) U.S. Cl. ........................................................ 345/102

(58) Field of Classification Search ............ 345/87–104, 345/83; 362/97.1–97.3; 349/61
See application file for complete search history.

(56) References Cited

U.S. PATENT DOCUMENTS

2002/0070914 A1 6/2002 Bruning et al.
2002/0089865 A1 7/2002 Yamamura et al.
2004/0135522 A1 7/2004 Berman et al.
2006/0125773 A1* 6/2006 Ichikawa et al. .............. 345/102
2006/0214905 A1* 9/2006 Okazaki ......................... 345/102
2007/0046485 A1* 3/2007 Grootes et al. ........... 340/815.45
2007/0164928 A1* 7/2007 Lee ................................ 345/30

FOREIGN PATENT DOCUMENTS

JP 09-331245 12/1997

(Continued)

OTHER PUBLICATIONS

Japanese Office Action, w/ English translation thereof, issued in Japanese Patent Application No. JP 2007-143095 dated Jan. 4, 2011.

(Continued)

*Primary Examiner* — Chanh Nguyen
*Assistant Examiner* — Allison Walthall
(74) *Attorney, Agent, or Firm* — McDermott Will & Emery LLP

(57) ABSTRACT

An LCD driving system using at least one of each of red, green and blue LED arrays composed of red LEDs, green LEDs, and blue LEDs connected in series, respectively. An SMPS includes an AC-DC converter for converting an externally inputted AC voltage to a DC voltage, and red, green and blue LED DC-DC converters for converting the DC voltage to a predetermined magnitude of DC voltage for driving the red, green and blue LED arrays. A light source includes a substrate with the red, green and blue LED arranged thereon, and each of red, green and blue LED constant current controllers for controlling the current running through the red, green and blue LED arrays so as to maintain predetermined outputs of the LEDs. A bridge board electrically connects the red, green and blue LED DC-DC converters with the red, green and blue LED constant current controllers, respectively.

4 Claims, 4 Drawing Sheets

FOREIGN PATENT DOCUMENTS

| | | | |
|---|---|---|---|
| JP | 3042951 | | 3/2000 |
| JP | 2002-199583 | | 7/2002 |
| JP | 2002-244619 | | 8/2002 |
| JP | 2004-253364 | | 9/2004 |
| JP | 2005-026431 | | 1/2005 |
| JP | 2005-310998 | | 11/2005 |
| JP | 2006-100036 | | 4/2006 |
| JP | 2006-120355 | | 5/2006 |
| WO | WO 02/080625 | A1 | 10/2002 |

OTHER PUBLICATIONS

C.-C. Chen et al., "LED Back-Light Driving System for LCD Panels," IEEE Applied Power Electronics Conference and Exposition, Mar. 23, 2006, pp. 381-385.

Netherland Office Action issued in The Netherlands Patent Application No. 2000668, mailed Sep. 2, 2010.

Japanese Office Action, with English Translation, issued in Japanese Patent Application No. 2007-143095, dated Aug. 2, 2011.

* cited by examiner

LIQUID CRYSTAL DISPLAY BACKLIGHT DRIVING SYSTEM WITH LIGHT EMITTING DIODES

CLAIM OF PRIORITY

This application claims the benefit of Korean Patent Application No. 2006-0059095 filed on Jun. 29, 2006, in the Korean Intellectual Property Office, the disclosure of which is incorporated herein by reference.

BACKGROUND OF THE INVENTION

1. Field of the Invention

The present invention relates to a driving system of a backlight of a Liquid Crystal Display (LCD) and, more particularly, to an LCD driving system having Light Emitting Diodes (LEDs) for driving a backlight of an LCD using a plurality of LEDs as a light source.

2. Description of the Related Art

Cold Cathode Fluorescent Lamps (CCFLs), which have been used as a light source for the existing LCD backlight unit, are prone to environmental pollution with use of mercury gas, have slow response rate and low color reproducibility, and are inappropriate for miniaturization of LCD panels.

On the other hand, LEDs are environmentally friendly, possible in high speed response in nanoseconds, which is effective for a video signal stream, and possible in impulsive driving. In addition, it has color reproducibility of over 100% and can be varied in luminance, color temperature, etc. by adjusting the light amounts of red, green and blue LEDs. Moreover, LED light sources are suitable for miniaturization of LCD panels. Due to these merits, LEDs have been actively adopted as a light source for backlight for LCD panels, etc.

When LED arrays with a plurality of LEDs connected in series are used in an LCD backlight, a driving system is required to provide a predetermined constant current to the LED arrays. FIG. 1 is a configuration view illustrating a conventional LCD backlight driving system having LEDs.

Referring to FIG. 1, the conventional LCD backlight driving system includes an SMPS 11, a driving board 12, and a light source 13. The SMPS converts an externally supplied AC voltage to a DC voltage. The driving board 12 includes a plurality of red, green and blue LED DC-DC converters 121, 122 and 123 for converting the DC voltage, converted by the SMPS 11, to a DC voltage suitable for driving respective color LED arrays, and includes red, green and blue constant current controllers 124, 125 and 126 for regulating the DC voltage converted by the DC-DC converters 121, 122 and 123 to maintain a regulated current supplied to the respective color LED arrays. The light source 13 includes a substrate 131 and the respective color LED arrays suitably arranged on the substrate 131, thereby producing white light from the mixture of the light beams from the LED arrays. The conventional LCD backlight driving system further includes a sensor 14 for detecting the luminance and/or color of the light emitted from the light source 13 and a micro-controller 127 provided in the driving board 12 for determining the outputs of the red, green and blue LEDs so as to conform the luminance and/or color of the light detected from the sensor 14 with predetermined luminance and/or color of light.

In such a conventional LCD backlight driving system, after the SMPS 11 converts the AC voltage to the DC voltage at an AC-DC converter 111, the converted DC voltage is converted again to a predetermined value of DC voltage at the DC-DC converter 112. Then, the DC voltage outputted from the DC-DC converter 112 of the SMPS 11 is stepped-up or down transformed to a voltage suitable for driving the corresponding color LED array in the respective LED DC-DC converters 121, 122 and 123. Therefore, in the conventional LCD driving system, similar operations of converting a DC voltage to a DC voltage are redundantly executed, resulting in inefficiency of the system and an increased number of components for the operations. Furthermore, each color LED array requires one DC-DC converter in the driving board 12, increasing the number of required components and the space for forming the circuit, which is not suitable for miniaturization of the LCD backlight.

SUMMARY OF THE INVENTION

The present invention has been made to solve the foregoing problems of the prior art and therefore an aspect of the present invention is to provide an LCD backlight driving system having LEDs, which increases circuit efficiency thereof and decreases the number of required components, thereby incurring low costs and promoting miniaturization.

According to an aspect of the invention, the invention provides an LCD driving system using at least one red LED array with a plurality of red LEDs emitting red light connected in series, at least one green LED array with a plurality of green LEDs emitting green light connected in series, and at least one blue LED array with a plurality of blue LEDs emitting blue light connected in series, as light sources. The LCD driving system includes an SMPS having an AC-DC converter for converting an externally inputted AC voltage to a DC voltage, a red LED DC-DC converter for converting the DC voltage, converted from the AC-DC converter, to a predetermined magnitude of DC voltage suitable for driving the red LED array, a green LED DC-DC converter for converting the DC voltage, converted from the AC-DC converter, to a predetermined magnitude of DC voltage suitable for driving the green LED array, and a blue LED DC-DC converter for converting the DC voltage, converted from the AC-DC converter, to a predetermined magnitude of DC voltage suitable for driving the blue LED array; a light source disposed on a substrate where the red, green and blue LED arrays are arranged, the light source having at least one of each of red, green and blue LED constant current controllers for controlling the current running through the red, green and blue LED arrays so as to maintain predetermined outputs from the red, green and blue LEDs; and a bridge board having circuit patterns for electrically connecting the red, green and blue LED DC-DC converters with the red, green and blue LED constant current controllers, respectively.

The LCD backlight driving system according to an embodiment of the present invention further includes a sensor for detecting at least one of luminance and color of light emitted from the light source; and a micro-controller for determining outputs of the red, green and blue LEDs such that at least one of the luminance and color of the light detected by the sensor conforms to predetermined luminance and color of light, wherein the at least red, green and blue LED constant current controllers control current running through the red, green and blue LED arrays, respectively, to maintain the outputs of the red, green and blue LEDs determined by the micro-controller.

In an embodiment of the present invention, the substrate has a plurality of divided regions, wherein one of each of the red, green and blue LED arrays and one of each of the red, green and blue constant current controllers connected to each of the red, green and blue LED arrays are provided in each of the divided region.

In an embodiment of the present invention, the red LED array is composed of a plurality of red LED arrays, the green LED array is composed of a plurality of green LED arrays, and the blue LED array is composed of a plurality of blue LED arrays, wherein each of the plurality of red LED arrays has the same number of red LEDs, each of the plurality of green LED arrays has the same number of green LEDs, and each of the plurality of blue LED arrays has the same number of blue LEDs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
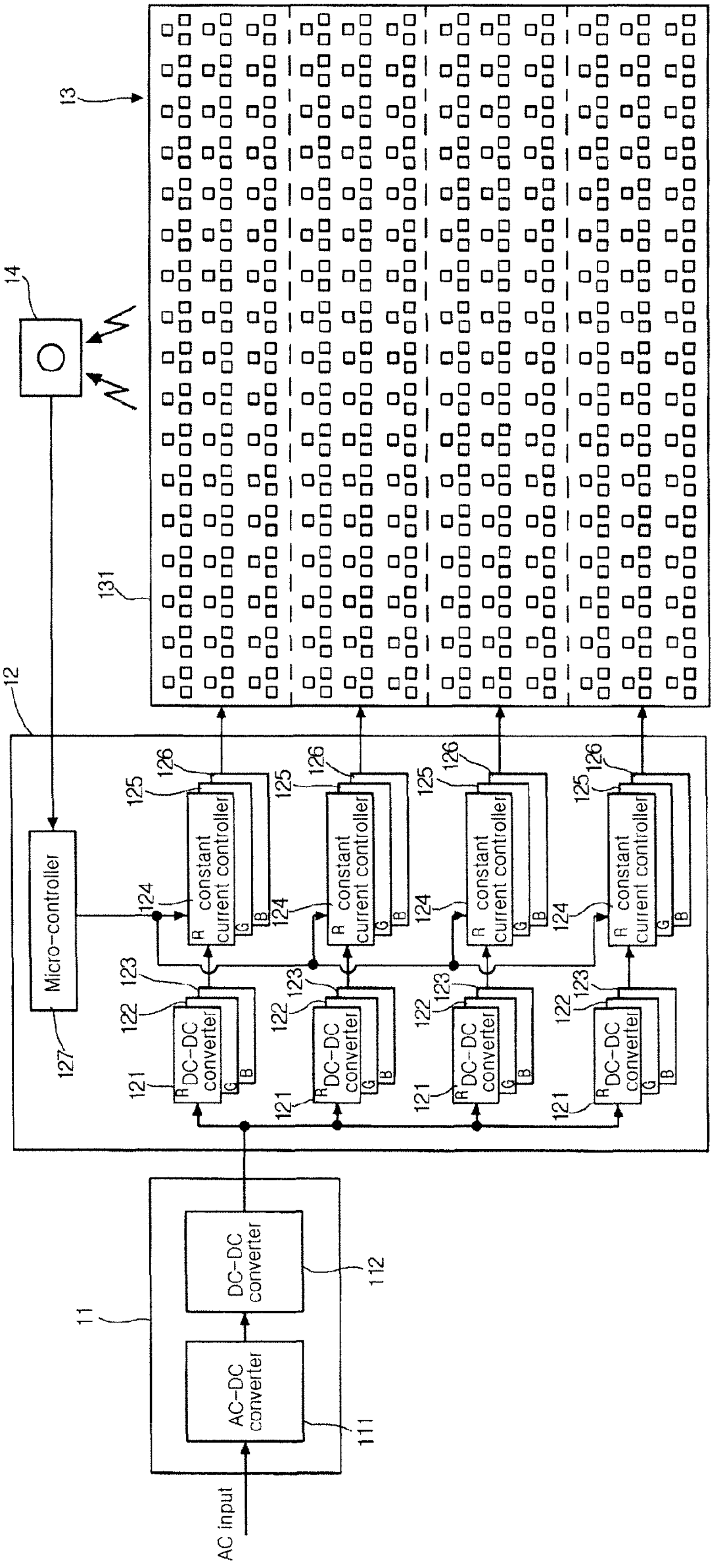
FIG. 1 PRIOR ART
FIG. 1 is a configuration view illustrating a conventional LCD backlight driving system with LEDs.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same or like components will be designated by the same reference numerals throughout.

Figure 2:
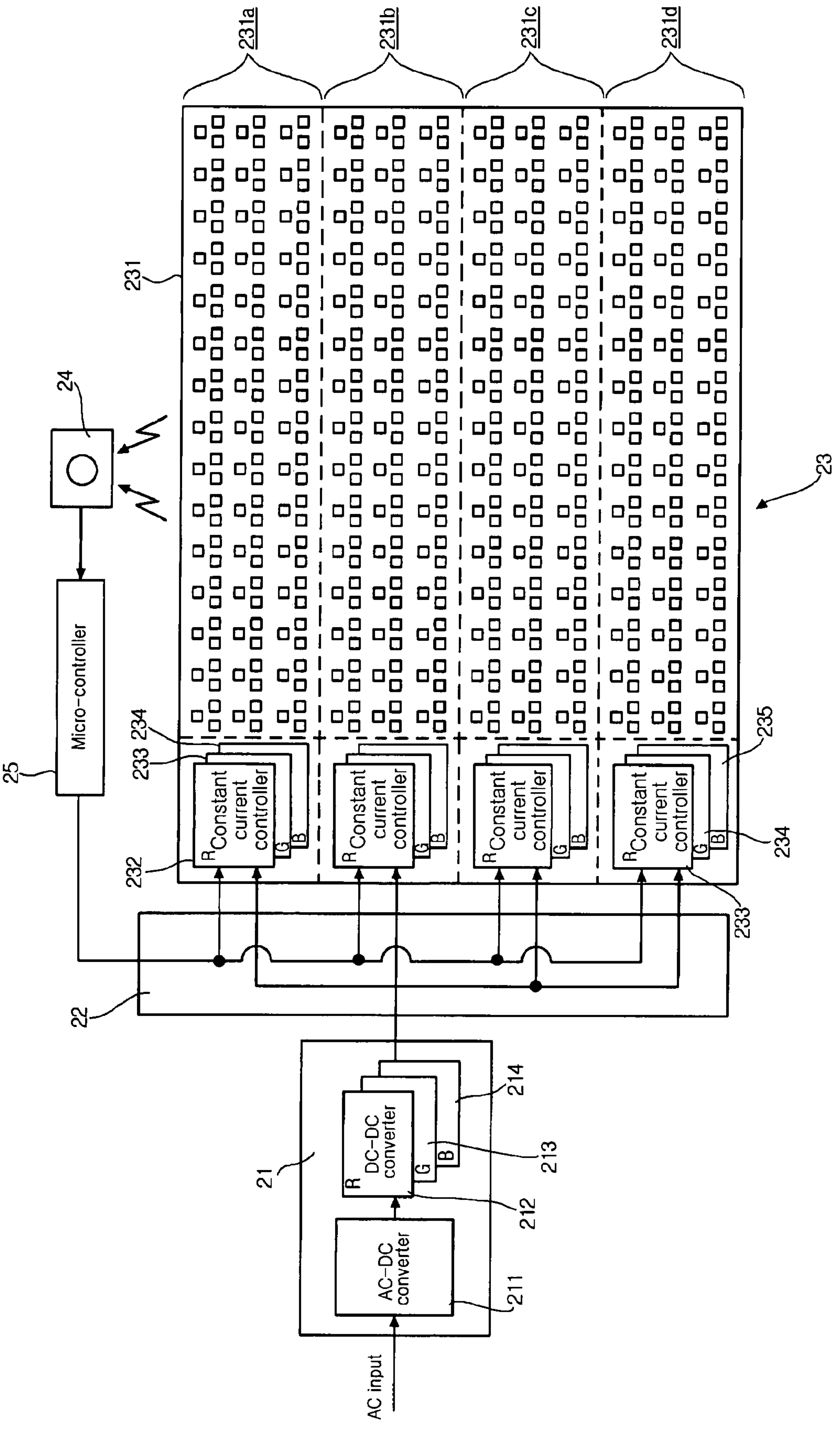
FIGS. 2 to 4 are configuration views illustrating LCD backlight driving systems according to various embodiments of the present invention.

FIG. 2 is a configuration view illustrating an LCD backlight driving system having LEDs according to an embodiment of the present invention.

Referring to FIG. 2, the LCD backlight driving system having LEDs according to an embodiment of the present invention broadly includes an SMPS 21, a bridge board 22, and a light source 23, and additionally a sensor 24 and a micro-controller 25.

The SMPS 21 includes an AC-DC converter 211 for receiving an externally supplied AC voltage to a predetermined magnitude of DC voltage; a red LED DC-DC converter 212 for converting the DC voltage converted from the AC-DC converter 211 to a predetermined magnitude of DC voltage suitable for driving at least one red LED array with a plurality of red LEDs emitting red light connected in series; a green LED DC-DC converter 213 for converting the DC voltage converted by the AC-DC converter 211 to a predetermined magnitude of DC voltage suitable for driving at least one green LED array with a plurality of green LEDs emitting green light connected in series; and a blue LED DC-DC converter 214 for converting the DC voltage converted by the AC-DC converter 211 to a predetermined magnitude of DC voltage suitable for driving at least one blue LED array with a plurality of LEDs emitting blue light connected in series. Each of the red, green and blue LED DC-DC converters 212, 213 and 214 may adopt a Pulse Width Modulation (PWM) boost or buck DC-DC converter, in which an on-off duty of a switching device is regulated to convert an input DC voltage to a desired magnitude of DC voltage.

The bridge board 22 does not have any electronic devices mounted thereon, but is composed of circuit patterns for electrically connecting the red, green and blue LED DC-DC converters 212, 213 and 214 with red, green and blue LED constant current controllers 233, 234 and 235. In the case where the LCD backlight driving system according to this embodiment further includes a sensor 24 and a micro-controller 25 for detecting the luminance and/or color of the light emitted from the light source, the bridge board 22 also includes circuit patterns for electrically connecting the red, green and blue LED constant current controllers 233, 234 and 235, to determine outputs of the red, green and blue LEDs, so as to conform the luminance and/or color of the light detected from the sensor 24 with predetermined luminance and color of light. Since the bridge board 22 does not include electronic devices, and only includes connectors connecting other components and lead patterns connecting the connectors, it can be configured in a very small volume.

The light source 23 includes a substrate 231, and at least one red LED array, at least one green LED array and at least one blue LED array disposed on the substrate 231. The red, green and blue LED arrays are disposed in an arrangement that allows mixing of the light beams therefrom to produce white light. In FIG. 2, the reference numeral '232' denotes the LED, and the LED array is not shown in detail for the simplicity of the drawings.

In addition, the light source 23 includes at least one of each of red, green and blue LED constant current controllers 233, 234 and 235, which controls the output voltage from each of the red, green and blue LED DC-DC converters 212, 213 and 214, to maintain a regulated current provided to each of the red, green and blue LED arrays. The red, green, and blue LED constant current controllers 233, 234 and 235 are disposed on the substrate 231. In the case where the LCD backlight driving system according to this embodiment includes a sensor 24 for detecting the luminance and/or color of the light emitted from the light source and a micro-controller 25, each of the red, green and blue LED constant current controllers 233, 234 and 235 regulates the output voltage from each of the red, green and blue LED DC-DC converters 212, 213 and 214, in order for the red, green and blue LEDs to maintain the outputs determined by the micro-controller 25, thereby maintaining a regulated magnitude of current supplied to each of the red, green and blue LED arrays.

Preferably, the substrate 231 of the light source 23 has a plurality of divided regions 231*a* to 231*d*, and one red LED array, one green LED array and one blue LED array are disposed in each of the divided regions 231*a* to 231*d*. In addition, one red LED constant current controller 233 is disposed corresponding to one red LED array in one of the divided regions 231*a* to 231*d* where the red LED array is disposed. In the same manner, one green LED constant current controller 234 is disposed corresponding to one green LED array in the divided region where the green LED array is disposed, and one blue LED constant current controller 235 is disposed corresponding to one blue LED array in the divided region where the blue LED array is disposed. That is, in each of the divided regions 231*a* to 231*d* of the substrate 231, one of each of the red, green and blue LED arrays, and one of each of the red, green and blue LED constant current controllers 233, 234 and 235 regulating the current supplied to each of the LED arrays are disposed. Therefore, the number of divided regions 231*a* to 231*d*, the number of each of the red, green and blue LED arrays, and the number of each of the red, green and blue LED constant current controllers 233, 234 and 235 are all equal.

In FIG. 2, the substrate 231 is illustrated to have four divided regions 231*a* to 231*d*, but the number of divided regions can be variously modified according to the size or application form of the LCD panel.

The sensor 24 detects the luminance and/or color of the light outputted from the light source 23. The sensor 24 can be composed of one sensor detecting the luminance and/or color of the light outputted from the entire light source 23, or can be composed of multiple sensors for detecting the luminance and/or color of the light emitted from the respective divided regions 231*a* to 231*d* of the substrate 231. In addition, the micro-controller 25 determines the outputs of the red, green and blue LEDs so as to conform the luminance and/or color of the light detected from the sensor 24 with predetermined luminance and color of light.

Now, the operations and effects of the invention will be explained in detail with reference to the accompanying drawings.

As shown in FIG. 2, the backlight driving system according to an embodiment of the present invention receives an externally supplied AC voltage as a power source for driving the LEDs of the light source 23. The externally supplied AC voltage is converted to a DC voltage in a suitable form by the SMPS 21.

First, the externally supplied AC voltage is converted to a DC voltage of a predetermined magnitude by the AC-DC converter 211. The AC-DC converter 211 may include an EMI filter, a rectifier, a power factor corrector, etc. as known to those skilled in the art.

Then, each of the red LED DC-DC converter 212, the green LED DC-DC converter 213 and blue LED DC-DC converter 214 converts the predetermined magnitude of DC voltage outputted from the AC-DC converter 211 to a predetermined magnitude of voltage suitable for driving each of the red, green and blue LED arrays.

For example, supposing that the magnitude of the output DC voltage from the AC-DC converter 211 is 380V, the red LED array is made up of 30 red LEDs, and the driving voltage required for one red LED is 3.3V, the red LED DC-DC converter 212 converts the DC voltage of 380V to a voltage necessary for driving the 30 red LEDs connected in series, which is 100V in this case. Each of the green and blue LED DC-DC converters 213 and 214 converts the voltage of 380V to a magnitude of voltage necessary to drive all of the LEDs included in the corresponding color LED array. The driving voltage converted by each of the red, green and blue LED DC-DC converters 212, 213 and 214 is applied to each of the plurality of LED arrays in the same manner, and thus each color LED array should be composed of equal number of LEDs connected in series in order for uniform luminance.

In the present invention, rather than the single DC-DC converter included in the conventional SMPS, a plurality of DC-DC converters are included in the SMPS to drive the respective colors of LED arrays. This improves the efficiency of the driving system with omission of the unnecessary DC-DC conversion processes and reduces the number of components. In addition, the respective colors of LED DC-DC converters, which are included in the driving board according to the prior art, are included in the SMPS according to the present invention to reduce the area occupied by the driving board. Moreover, the same color LEDs are operated commonly by only one DC-DC converter to significantly reduce the number of components according to the present invention.

The driving voltage, provided from each of the red, green and blue LED DC-DC converters 212, 213 and 214 in the SMPS 21, is provided to each of the red, green and blue LED constant current controllers 233, 234 and 235 disposed on the substrate 231 of the light source 23 through the circuit patterns of the bridge board 22. Each of the red, green and blue LED constant current controllers 233, 234 and 235 appropriately regulates the provided DC voltage and supply a regulated magnitude of current to each of the red, green and blue LED arrays. Therefore, the number of each of the red, green and blue LED constant current controllers 233, 234 and 235 equals to the number of each of the red, green and blue LED arrays, and one of each of the red, green and blue LED constant current controllers 233, 234 and 235 is connected to one of each of the red, green and blue LED arrays to drive the same.

In addition, when the sensor 24 detects the luminance and/or color of the mixed light from the respective color LEDs, the information on the luminance and/or color of the light detected by the sensor 24 is transmitted to the micro-controller 25, which then determines the outputs of the red, green and blue LEDs to conform to predetermined luminance and color of light and transmits this determined output information through the bridge board 22 to the respective red, green and blue LED constant current controllers 233, 234 and 235 provided on the substrate 231. Then, each of the red, green and blue LED constant current controllers 233, 234 and 235 regulates the driving voltage and provides a predetermined magnitude of current to each color LED array according to the output information determined by the micro-controller 25.

In the meantime, the substrate 231 of the light source 23 is divided into a plurality of regions 231*a* to 231*d*. In each of the divided regions, one red LED array, one green LED array and one blue LED array, and one of each of the red, green and blue LED constant current controllers 233, 234 and 235 for providing a predetermined magnitude of current to each of the respective color LED arrays, can be provided. These divided regions 231*a* to 231*d* serve the purpose of distinguishing one set of the LED arrays controlled by one set of the constant current controllers 233, 234 and 235 from other set of the LED arrays, and serve the purpose of local dimming in which the luminance and/or color is individually controlled for each of the divided regions, in the case where a plurality of sensors are provided to detect the luminance and/or color for the respective divided regions.

According to the present invention, the red, green and blue LED constant current controllers 233, 234 and 235, which are mounted in the driving board in the prior art, are provided on the substrate 231 of the light source 23, thereby saving the space needed for disposing the driving board. Also, in terms of the manufacturing process, the step of surface-mounting the LEDs on the light source 23 can be implemented at the same time as the step of surface-mounting the components constructing the constant current controllers 233, 234 and 235. This allows omission of the step of separately fabricating the driving board to simplify the manufacturing process.

Now, various embodiments of the present invention will be explained in detail with reference to the accompanying drawings.

Figure 3:
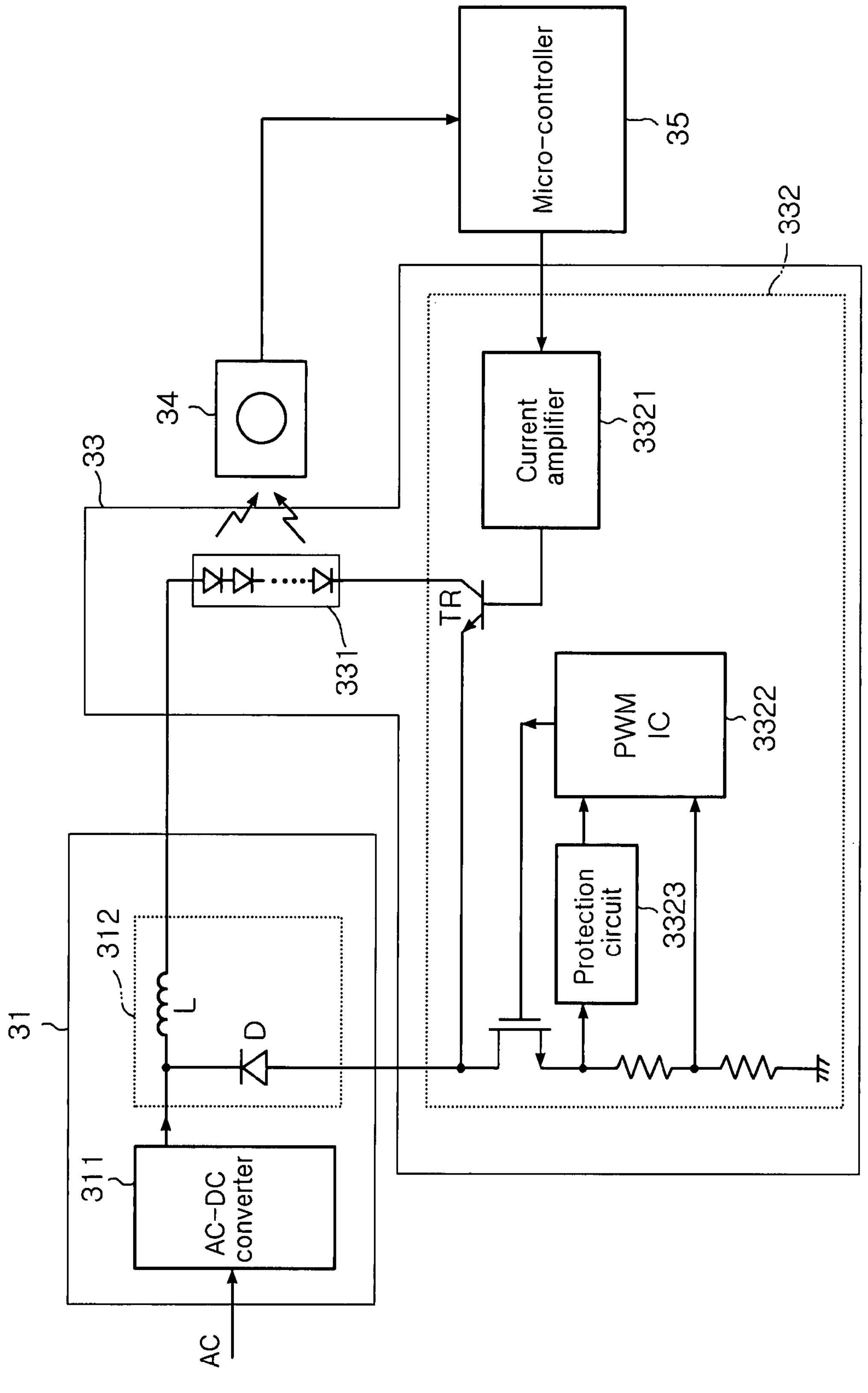

FIG. 3 is a configuration view illustrating a circuit of the LCD backlight driving system having LEDs according to another embodiment of the present invention. FIG. 3 illustrates an embodiment in which the current running through the LED array 331 of the light source 33 is fed back to control the output voltage of the LED DC-DC converter 312 in the SMPS 31. In this embodiment, the output of the single LED DC-DC converter 312 in the SMPS 31 is controlled according to the current of the LED array 331. Thus, this embodiment can be applied only to a light source having one of each of the red, green and blue LED arrays. For the sake of convenience in explanation, FIG. 3 illustrates only one color LED array. Therefore, the same configurations of the LED array, the constant current controller and the DC-DC converter can be provided for each color. In addition, in this embodiment shown in FIG. 3, the bridge board, which only forms the connection structure, is omitted.

As shown in FIG. 3, this embodiment adopts a buck type DC-DC converter 312 with a diode D and an inductor L connected. The light outputted from the LED array 331 is detected by the sensor 34, and the detection result is transmitted to the micro-controller 35. The micro-controller 35 transmits a suitable control current to a current amplifier 3321 in the constant current controller 332 in the light source 33 so as to maintain a preset output according to the light output detected. The current amplifier 3321 amplifies the control current of the micro-controller 35 and provides the amplified control current to a base end of a transistor TR having a collector connected to an output end of the LED array and an emitter connected to an anode of the diode D of the DC-DC converter 312, thereby regulating the output of the DC-DC converter 312. This allows regulation of the constant current for the LED array 331.

In addition, the constant current controller 332 may further include various detection resistors R1 and R2; a PWM IC 3322 which outputs a pulse signal with a duty controlled such that the on/off time of a switch S1 is controlled in accordance with the voltage value detected from the detection resistors R1 and R2; and a protection circuit 3323 which drives the PWM IC 3322 so as to block over voltage from voltage values detected by the detection resistors R1 and R2.

Figure 4:
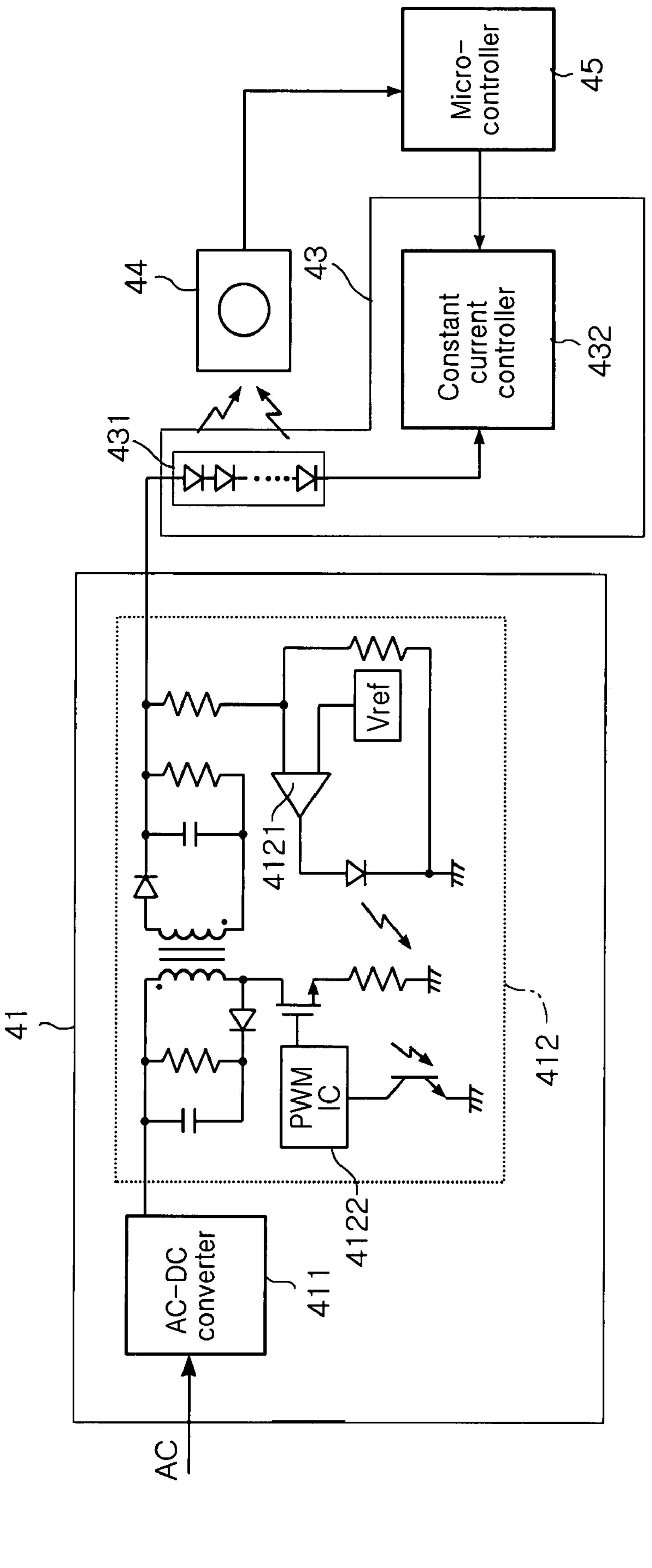

FIG. 4 is a configuration view of a circuit of a LCD backlight driving system having LEDs according to further another embodiment of the present invention. FIG. 4 illustrates an embodiment with a flyback type DC-DC converter 412 applied, in which the current outputted from the LED array 431 is directly controlled by the constant current controller 432 in the light source 43. In the embodiment shown in FIG. 4, the constant current controller can be provided for each LED array, and thus the embodiment can be applied to a light source having a plurality of LED arrays for each of the different colors. In the meantime, FIG. 4 illustrates one LED array for the sake of convenience in explanation, but there can be provided the same configuration of constant current controller for each of the plurality of LED arrays. In addition, as shown in FIG. 3, the bridge board, which only forms a connection structure, is omitted.

As shown in FIG. 4, this embodiment adopts a flyback type DC-DC converter 412 with a coil transformer applied thereto. The light output from the LED array 431 is detected by the sensor 44, and the detection result is transmitted to the micro-controller 45. The micro-controller 45 determines a magnitude of current that maintains a predetermined output, in accordance with the detected light output. Then, the constant current controller 432 regulates the current running through the LED array 431 to maintain the magnitude of current determined by the micro-controller 45.

In the meantime, the flyback type DC-DC converter 412 may include a comparator 4121 for comparing the output voltage with a reference voltage Vref, and a PWM IC 4122 for regulating the voltage at a primary coil by PWM method according to the comparison result.

According to the present invention as set forth above, a DC-DC converter is provided in a SMPS to drive respective colors of LEDs, omitting unnecessary DC-DC conversion processes in the conventional SMPS, thereby improving circuit efficiency.

Moreover, a plurality of DC-DC converters for each color LEDs provided in the conventional driving board are integrated into a single one in the SMPS according to the present invention, thereby significantly reducing the number of components and power consumption and decreasing the size of the driving board.

Furthermore, a constant current controller mounted in the driving board in the prior art is provided on a substrate of the light source according to the present invention, thereby saving the space for disposing the driving board. In addition, in terms of the manufacturing process, the step of surface-mounting the LEDs in the light source can be implemented at the same time as the step of surface-mounting the components constituting the constant current controller, omitting the step of separately fabricating the driving board in the prior art, thereby simplifying the manufacturing process.

While the present invention has been shown and described in connection with the exemplary embodiments, it will be apparent to those skilled in the art that modifications and variations can be made without departing from the spirit and scope of the invention as defined by the appended claims.

What is claimed is:

1. A liquid crystal display backlight driving system using at least one red light emitting diode (LED) array with a plurality of red LEDs emitting red light connected in series, at least one green LED array with a plurality of green LEDs emitting green light connected in series, and at least one blue LED array with a plurality of blue LEDs emitting blue light connected in series as light sources, comprising:

a switch mode power supply (SMPS) having an AC-DC converter for converting an externally inputted AC voltage to a DC voltage, a red LED DC-DC converter for converting the DC voltage, converted from the AC-DC converter, to a predetermined magnitude of DC voltage suitable for driving the red LED array, a green LED DC-DC converter for converting the DC voltage, converted from the AC-DC converter, to a predetermined magnitude of DC voltage suitable for driving the green LED array, and a blue LED DC-DC converter for converting the DC voltage, converted from the AC-DC converter, to a predetermined magnitude of DC voltage suitable for driving the blue LED array, wherein all of the same color LED arrays are operated commonly by a single DC-DC converter;

a light source disposed on a substrate where the red, green and blue LED arrays are arranged, the light source having at least one of each of red, green and blue LED constant current controllers for controlling the current running through the red, green and blue LED arrays so as to maintain predetermined outputs from the red, green and blue LEDs; and a bridge board having circuit patterns for electrically connecting the red, green and blue LED DC-DC converters with the red, green and blue LED constant current controllers, respectively, wherein the bridge board does not have any electronic devices mounted thereon.

2. The liquid crystal display backlight driving system according to claim 1, further comprising:

a sensor for detecting at least one of luminance and color of light emitted from the light source; and a micro-controller for determining outputs of the red, green and blue LEDs such that at least one of the luminance and color of the light detected by the sensor conforms to predetermined luminance and color of light, wherein the at least red, green and blue LED constant current controllers control current running through the red, green and blue LED arrays, respectively, to maintain the outputs of the red, green and blue LEDs determined by the micro-controller.

3. The liquid crystal display backlight driving system according to claim 1, wherein the substrate has a plurality of divided regions, wherein one of each of the red, green and blue LED arrays and one of each of the red, green and blue constant current controllers connected to each of the red, green and blue LED arrays are provided in each of the divided region.

4. The liquid crystal display backlight driving system according to claim 1, wherein the red LED array comprises a plurality of red LED arrays, the green LED array comprises a plurality of green LED arrays, and the blue LED array comprises a plurality of blue LED arrays, wherein each of the plurality of red LED arrays has the same number of red LEDs, each of the plurality of green LED arrays has the same number of green LEDs, and each of the plurality of blue LED arrays has the same number of blue LEDs.

* * * * *